May 31, 1960  F. A. DAHMS  2,938,626
AUTOMATIC WEIGHING MACHINE

Filed Nov. 6, 1953  5 Sheets-Sheet 1

INVENTOR
FRANCIS A. DAHMS
BY Bates & Willard
ATTORNEYS

May 31, 1960  F. A. DAHMS  2,938,626
AUTOMATIC WEIGHING MACHINE
Filed Nov. 6, 1953  5 Sheets-Sheet 2

INVENTOR
FRANCIS A. DAHMS
BY Bates + Willard
ATTORNEYS

INVENTOR
FRANCIS A. DAHMS
BY Bates + Willard
ATTORNEYS

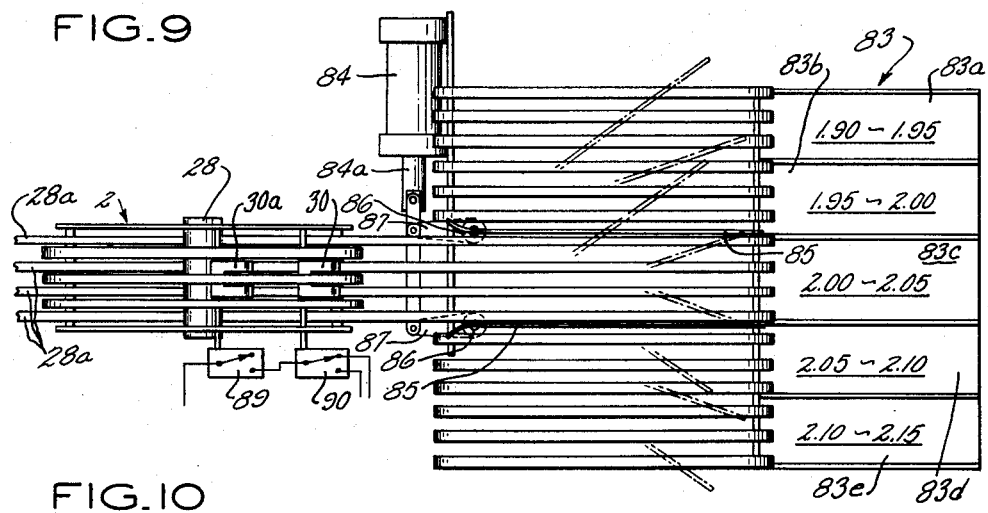
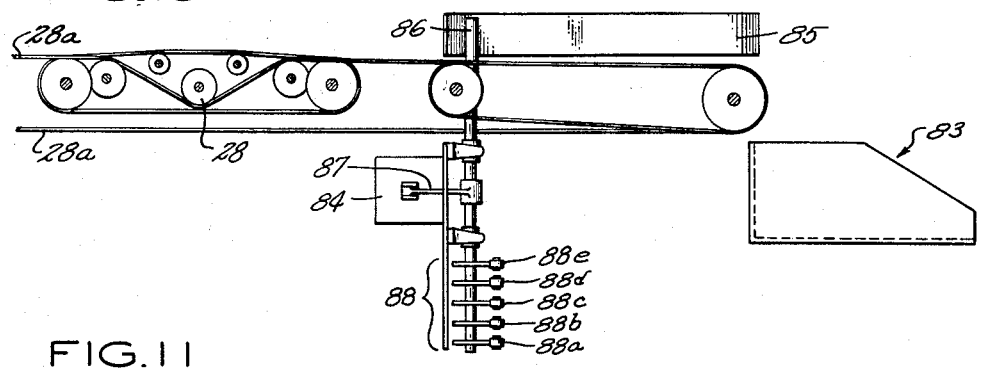
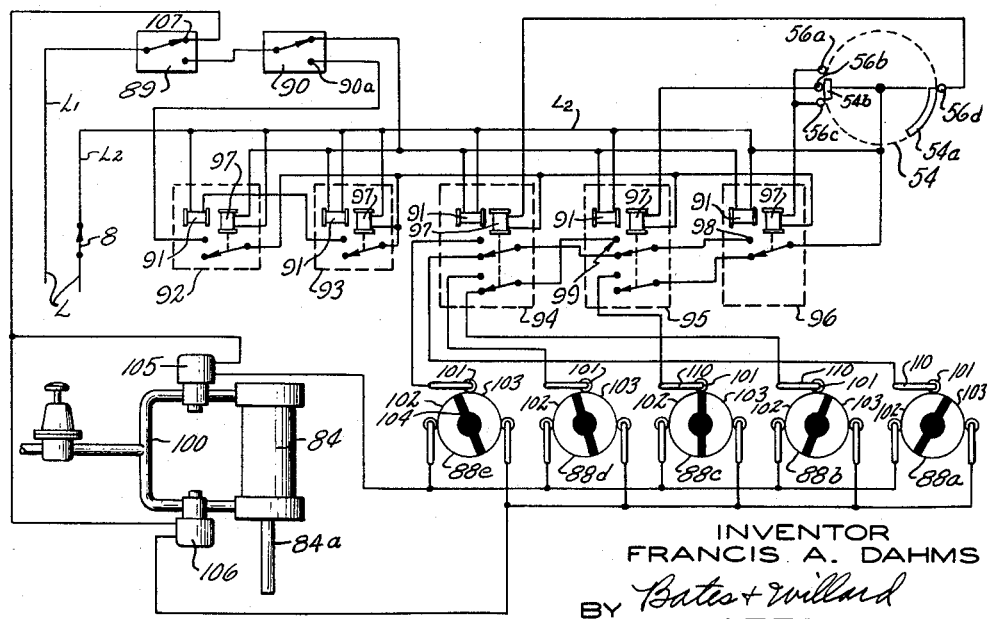

May 31, 1960  F. A. DAHMS  2,938,626
AUTOMATIC WEIGHING MACHINE
Filed Nov. 6, 1953  5 Sheets-Sheet 5

INVENTOR
FRANCIS A. DAHMS
BY Bates + Willard
ATTORNEYS

United States Patent Office 2,938,626
Patented May 31, 1960

2,938,626
AUTOMATIC WEIGHING MACHINE

Francis A. Dahms, Manchester, Conn., assignor to Emhart Manufacturing Company, Hartford, Conn., a corporation of Delaware Filed Nov. 6, 1953, Serial No. 390,511

6 Claims. (Cl. 209—121)

This invention relates to automatic weighing equipment and more particularly to equipment for weighing successively articles of a moving line of articles without interrupting their movement.

In accordance with the invention, the articles are weighed individually or in selected groups and automatically classified or segregated by weight in as many divisions and with such refinement of selectivity as desired. Equipment embodying the invention may identify items of a line as acceptable or unacceptable in weight and the acceptable weight may be established within broad or narrow tolerance limits. If desired, the unacceptable may be further identified as "over" or "under." In addition, the weight variant from the "acceptable" may be automatically indicated either in weight or other units, as, for example, the shortage or overage may be indicated in selected fractional or multiple units of the product, such as sliced bacon, for hand correction or for operating automatic loading or filling devices on the line.

Among the objects of the invention are to provide automatic weighing apparatus in which continuous uninterrupted movement of the articles undergoing weighing is maintained and to avoid use of indexing or positioning devices for the articles being weighed.

A further object is to provide apparatus of this character which is highly accurate and responsive to minute weight variations in the articles being handled.

Another and more specific object is to provide apparatus including a weighing scale mechanism having a motor driven receiver supporting both its conveyor and the motor and means for transferring sticky prearranged articles such as sliced bacon from a conveyor to the scale receiver without sliding or pushing, dumping, or otherwise disturbing the prearrangement.

A still further object is to provide in the described apparatus, pneumatically responsive controls actuated by a movable beam of the weighing mechanism to operate a series of electrical contacts.

A further object is to provide weighing apparatus of a simple, positive and reliable construction which may be used for prolonged periods of operation without requiring undue attention, adjustment or repairs.

Apparatus embodying the invention is adapted for sensitive high speed weighing. As is hereinafter described in greater detail, a preferred embodiment provides a plurality of intermeshing ribbon conveyors with which successive articles are continually moved forward toward segregating, correcting and packaging stations, or whichever of them may be required by the particular line. One of the intermeshing conveyor sections is a component part of a weighing mechanism over which the articles being handled individually pass without interruption in their movement. A pivotally movable member of the weighing mechanism responds to weight of the articles on the weighing section and automatically operates an air motor which controls the opening and closing of a series of electrical circuits which actuate segregating, direct weight indicating, filling control and recorder mechanism, or any of them.

For a further understanding of the invention, including additional objects and advantages, reference may be had to the following description and the accompanying drawings, in which:

Figs. 9 and 10 are plan and side elevation views, respectively, of the conveyor and segregating gates for dividing articles into weight groups;

Fig. 11 is a wiring and piping diagram for the apparatus shown in Figs. 9 and 10.

Figure 1:
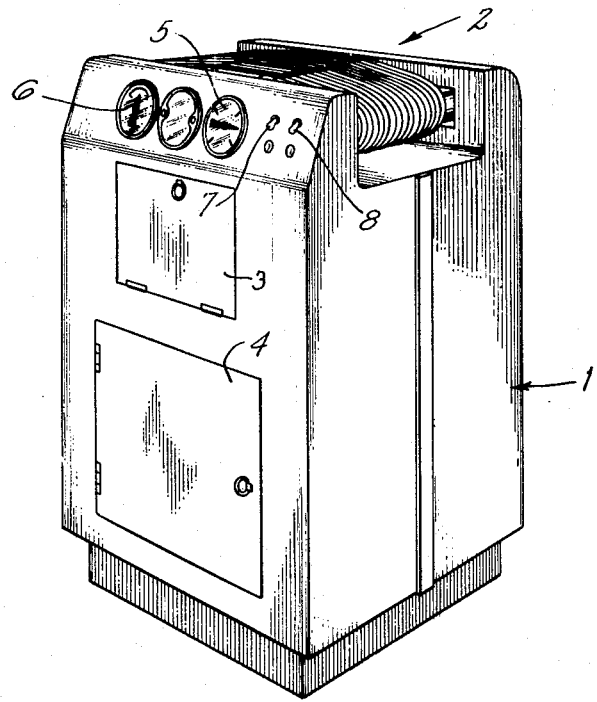
Fig. 1 is a perspective view of weighing apparatus embodying the invention.

Referring to the drawings, a housing or cabinet 1 in which the weighing apparatus (Figs. 2 and 3) is located, completely encloses the electric and pneumatic components of a balance unit having a conveyor-receiver scale generally designated 2. Doors 3 and 4 on the front of the cabinet 1 cover compartments containing the pneumatic and electrical controls, respectively. Two gages 5 and 6 at the top of the cabinet indicate regulated air pressure and weight, respectively. Two switch buttons 7 and 8 to the right of the gages operate on-off switches for a conveyor motor M (Fig. 2) and the electrical control system. All other manual controls are contained within the upper enclosed compartment behind the door 3.

Figure 2:
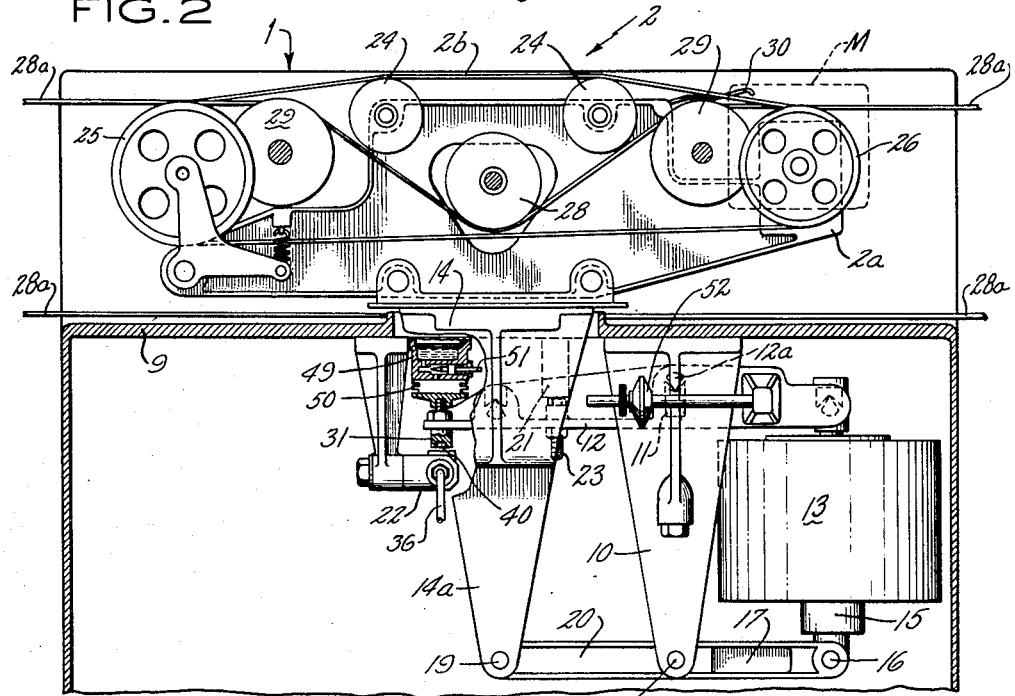
Fig. 2 is a vertical sectional view taken through the weighing apparatus showing balance mechanism and an intermeshing ribbon conveyor.
Figure 3:
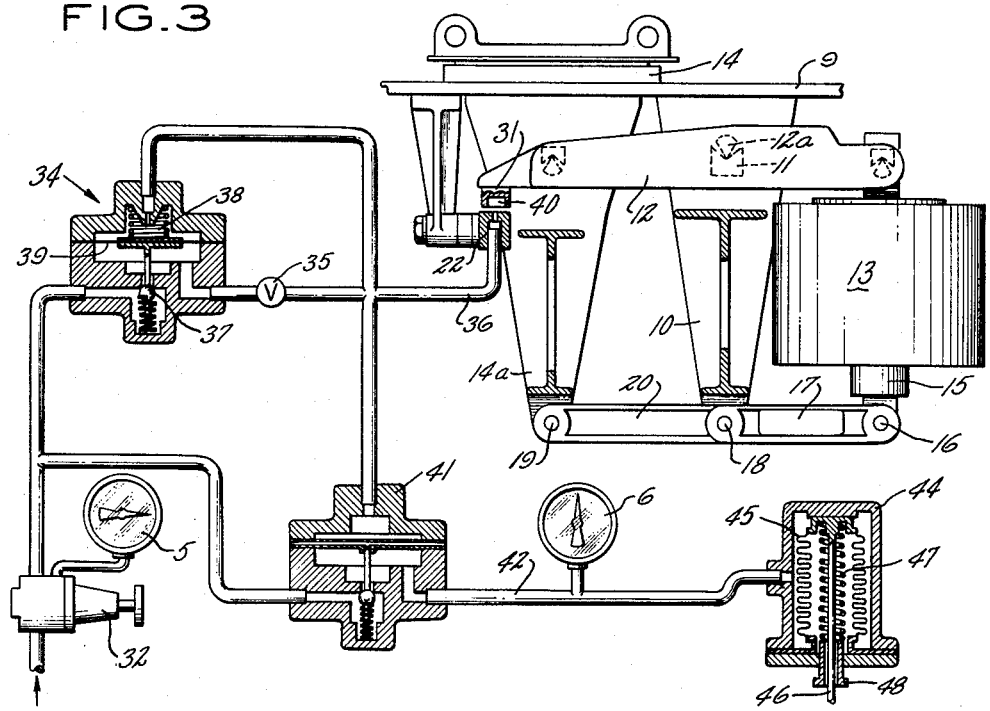
Fig. 3 is a diagram of a pneumatic system which forms a part of the balance mechanism.

As illustrated in Figs. 2 and 3, secured to the housing 1 is a stationary horizontal table plate 9 from which extends a stationary bracket 10 having a fulcrum support 11 for fulcrum 12a of a pivotally mounted weighing beam or lever 12. The ends of the beam 12 respectively carry pivotally mounted a known weight 13 and a support 14 for frame 2a of the receiver 2. The weight 13 has a downwardly projecting rigid stem 15, the lower end of which is pivoted at 16 to one end of check link 17, the other end of which is pivoted on a bearing 18 that is rigidly connected to the bracket 10. The conveyor support 14 also has a downwardly extending rigid bracket 14a, the lower end of which is pivotally secured as at 19 to the outer end of a check link 20, the inner end of which is pivoted on the bearing 18. Stop block 21 and air plate 22, both of which are fixedly secured to the stationary plate 9, limit the pivotal movement of the beam 12 within an adjustable range which is predetermined by adjustment of screw 23 carried by the beam 12. This movement is kept to a minimum for maximum speed of response.

Figure 8:
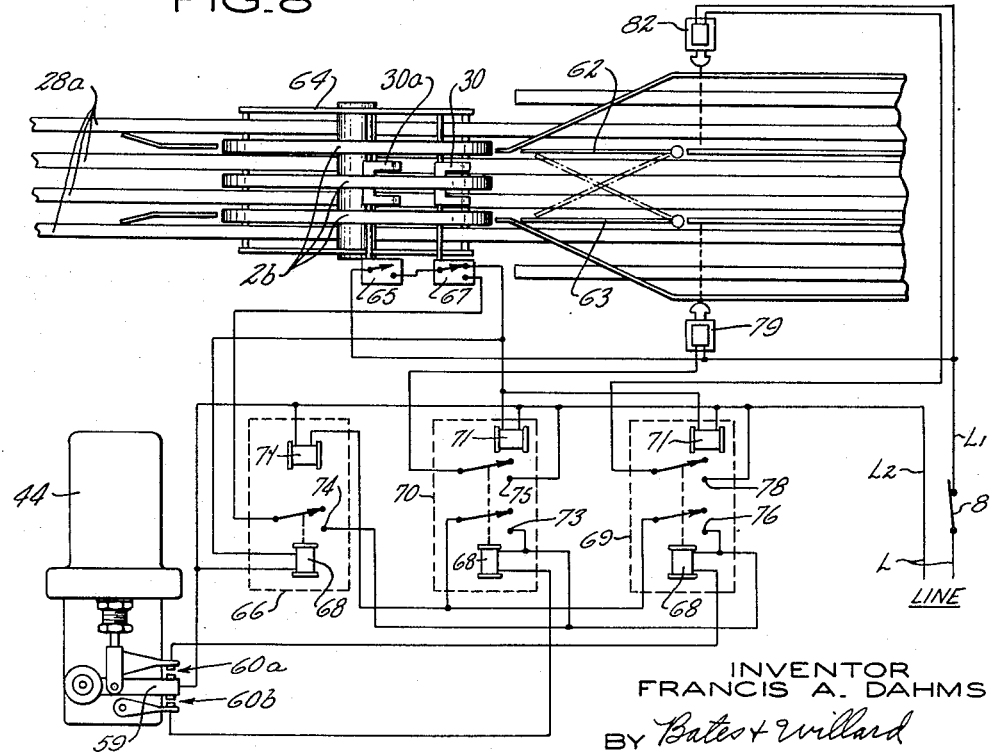
Fig. 8 is a diagram of a circuit controlled by the air motor to divert from the line articles that are under and over weight and a plan view showing the conveyor and diverting gates.

The receiver 2 includes a ribbon conveyor having a number of spaced ribbons or belts 2b which pass over rolls 24, take-up pulleys 25 and drive pulleys 26 which are driven by a motor M mounted on the frame 2a. The complete unit 2, including the frame 2a, the bracket 14 and the motor M, is pivotally supported on the end of beam 12. Roll 28 and pulleys 29 are rotatably carried by the housing and guide conveyor ribbons 28a which feed articles to and remove them from the conveyor ribbons 2b. As shown in Figs. 2, 8 and 9, portions of the ribbons 2b and 28a are partly coextensive so that the intermeshing and overlapping of the ribbons 2b and 28a provides a smooth transfer from the conveyor ribbons 28a to the receiver ribbons 2b and a smooth transfer back to the ribbons 28a without tipping or sliding the article to be weighed on the receiver 2.

As shown in Figs. 2 and 3, a cup 31 is mounted on the receiver end of beam 12 directly above plate 22 which is mounted rigidly relative to the housing plate 9. Pivotal movement of beam 12 changes the gap between the cup 31 and air plate 22. As illustrated in Fig. 3, air is supplied to the plate 22 through a line 36 from a supply source at a pressure which is regulated by a pressure regulator 32 the regulated pressure of which is indicated by the gage 5. The regulated pressure is fed through a constant flow control 34, the flow through which is adjustable by a needle valve 35, also known as the zero adjustment. The flow control 34 in the supply line 36 provides a constant air flow to the air gap between the air plate 22 and the cup 31. When weight is applied to the receiver 2 the air gap is reduced thus increasing the air pressure in line 36. This increased pressure gives an additional lift force to cup 31.

The pressure change in line 36 is proportionate to the movement of cup 31 relative to the plate 22 and the movement of the cup 31 is directly responsive to changes in weight on the carrier 2, the internal pressure in the small plenum 40 providing a compensating lift force on the cup 31.

Without the flow control 34, the cup 31 would over-ride the balance point which would again reduce the air pressure and excessive hunting would occur until a balance was reached. The flow control 34 minimizes hunting and line pressure variations and makes critical pressure regulation of the air supply unnecessary. The flow control 34 maintains a constant differential pressure across the needle valve 35 by means of a valve 37 which is operated by a flexible diaphragm 39. This constant differential pressure which is determined by the force of a spring 38 assures a constant flow through needle valve 35. Adjustment of needle valve 35 not only regulate the flow but also regulates the air pressure in line 36 subject to change in the gap or bleed spacing between the air plate 22 and cup 31.

If, for example, a one pound article is to be weighed and the expected variation is within two ounces over or under, the maximum lift force would be four ounces and fourteen ounces would be counterbalanced out by weight 13, Fig. 2. The flat portion or land around the plenum at the bottom of cup 31 provides a damping effect to the momentum of the balance because of the cushioning effect of the air stream between this land and air plate 22 and also regulates the bleed flow rate to reduce surging with pressure changes.

The variable air pressure in line 36 which is controlled by weight variations, is supplied to a pneumatic booster relay 41 which transmits an air pressure to line 42 in direct proportion to the pressure in line 36. The relay 41 provides a large air capacity with no loss of air by by-passing the flow control 34 and needle valve 35.

The ratio of air pressures between line 36 and 42 is determined by the weight range and accuracy required. When a wide range is required, a one to one ratio would be used and for accuracy a ratio as high as one to six would be used. The output pressure in line 42 is indicated by the gage 6 which is graduated in scale weight rather than pressure so as to directly indicate weight, and is fed to an air motor 44. The pressure of line 42 is applied to the outer surface of bellows 45 which moves rod 46 down. The bellows load is counterbalanced in part by a spring 47 which has a load adjustment screw 48 for positioning rod 46.

Where excessive vibration is evidenced by movement of the weight indicator 6, a damping control is provided. More particularly, referring to Fig. 2, a chamber 49 is rigidly mounted on the fixed plate 9 and communicates with the cavity of a bellows 50, the lower end of which is fastened to beam 12. Between the cavity of the bellows 50 and the chamber 49 is an adjustable restricting needle valve 51. The bellows cavity and chamber 49 are filled with a light oil and adjustable damping is provided by varying the needle valve controlled opening therebetween which regulates the flow of oil between the chamber and bellows. The spring action of the bellows 50 is negligible due to the very minute movement of the beam 12 with weight variations.

A slide weight 52 is provided to counterbalance out weight other than that of the article as, for example, the weight of chip-boards or cartons carrying the articles which are to be weighed.

Figure 4:
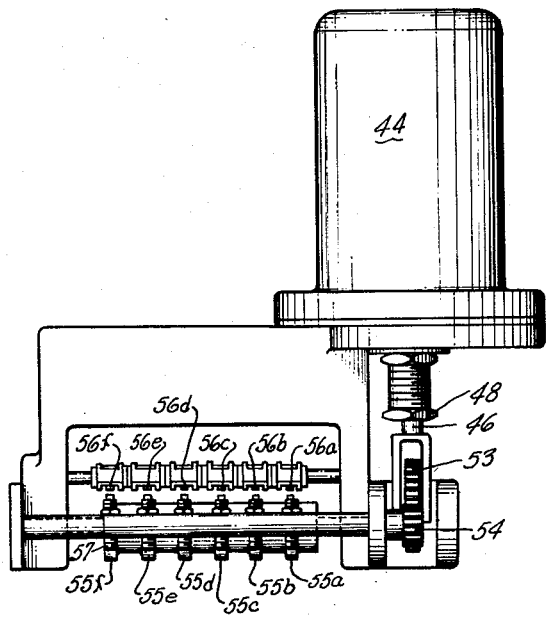
Figs. 4 and 5 are enlarged views of an air motor shown in Fig. 3 which operates electrical contacts that control visual indication, segregating, or other mechanism.
Figure 5:
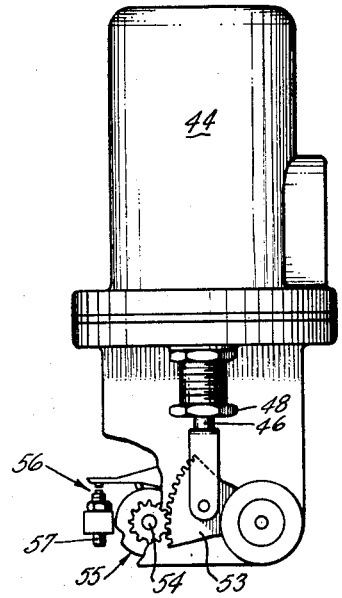

The out-put movement from the air motor rod 46 (Fig. 3) can be used in various ways as illustrated in Figs. 4, 5, 6 and 7. Referring to Figs. 4 and 5, the air motor 44 swings a gear sector 53 which in turn rotates gear and cam shaft 54. The pivot point of the sector 53 preferably is eccentrically mounted to avoid gear backlash. Cams 55a, 55b, 55c et al. on the cam shaft 54 control the opening and closing of electrical contacts 56a, 56b, 56c et al., generally designed 56. These cams, which are generally designated 55, preferably are set so as to always have one or a pair of the contacts 56 closed through the preselected operative range so as to eliminate any dead spots in the range. The gaps between the pairs of contacts 56 are adjustable with screws 57 and the angular spacing of the low points of the several cams may be adjusted by turning and locking the cams individually on the cam shaft 54. Positioning of the set of cams in relation to weight on the receiver is adjusted by screw 48 which changes the load exerted by the spring 47 (Fig. 3) on the air motor 44. This adjustment does not appreciably effect the spring rate and thus acts only as a positioner and not as a range adjustment.

Figure 6:
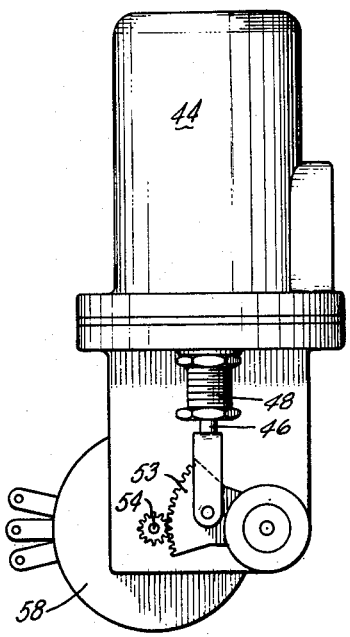
Fig. 6 is a view of the air motor of Figs. 4 and 5 shown with a potentiometer for recording weight variations.

Fig. 6 shows the air motor 44 as used to operate a recorder (not shown) for statistical regulation of production lines. In this case the gear sector 53 and the gear and shaft 54 operate a potentiometer 58 which provides a variable millivolt output to the recorder.

Figure 7:
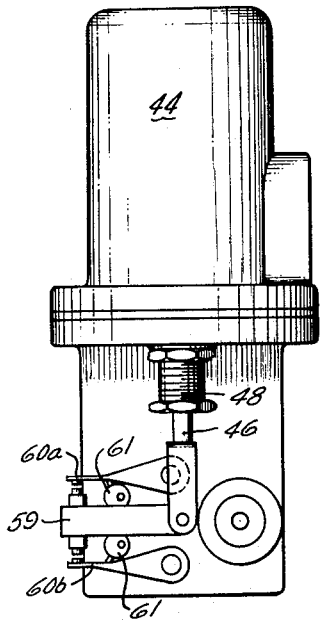
Fig. 7 is a view of the air motor with electrical contacts as used for "under-pass-over" classifying.

Fig. 7 shows the air motor 44 as used for segregating weighed articles into three groups according to their weight as under-weight, within-weight and overweight. The motor 44 moves contact lever 59 to open and close two pairs of contacts 60a and 60b. As long as both of the contacts 60a, 60b, are open, weighed articles are passed as on-weight. As is apparent from Fig. 8, if either of the contacts 60a or 60b is closed, the corresponding diverting gate 62, 63 (respectively) is operated to divert the under or over-weight article which closes the contact from the center or within-weight line into the proper side line, one of which is for under-weight articles and the other for over-weight articles. When the lever 59 is in its on-weight position shown in Fig. 7, the gaps between the contacts 60a and 60b correspond respectively to the "over" and "under" allowable weight tolerances. The gaps are adjustable by rotating and setting eccentrics 61.

Referring more particularly to Fig. 8, a small lever 30 extending between the receiver ribbons 2b, moves a double-throw electrical switch 67 from a normal or first position to a second position when engaged by the article being weighed. When the switch 67 is moved as described, the weight of an article being weighed is given to the electrical system to be used immediately or held in an electrical memory bank for later indication, segregation control, recording, filling or the like.

An article passing over the scale conveyor ribbons 2b first engages a reset lever 30a which thereupon closes a normally open reset switch 65. Closing of the switch 65 energizes unlatching coils 71 of relays 69 and 70 and latching coil 68 of a relay 66 which closes and latches closed contacts 74 of the mechanical latching type relay 66 through the normally closed side of a double-throw firing switch 67. Subsequent engagement of lever 30 closes the normally open side of the firing switch 67 which thereupon connects leg L1 of the line L to latching relay coils 68 of relays 69 and 70 through closed contacts 74 of the latched relay 66.

As previously described, the air motor 44 is set by the weight of the article and the arm 59 positioned by the motor. When either contact 60a or 60b is closed by arm 59, the latching relay coil 68 of either relay 69 or 70 is connected to leg L2 of the line L and that coil energized closing its relay contacts and thereby supplying current either through contacts 73 or 76 to coil 71 of relay 66 which breaks the line to coils 68 of relays 69 and 70 by unlatching and opening contacts 74. Thus there is provided only a momentary connection of either coil 68 of relays 69 and 70 to the line which occurs while the weight of the article is on the ribbons 2b of the receiver 2.

If, for example, the article is over weight, the contacts 60b are closed energizing coil 68 of relay 70 which closes and latches contacts 73 and 75. Coil 71 of relay 66 which unlatches and opens 74 is energized through contacts 73 and a solenoid 79 is energized through contacts 75. Coil 71 of relay 66 is immediately de-energized as the line to this coil is supplied through contacts 74. When solenoid 79 is energized gate 63 moves to the dotted position (Fig. 8) diverting the overweight article to the side of the take-off conveyor.

If the article on the receiver ribbon 2b is underweight, contacts 60a close thereby energizing coil 68 of relay 69 and closing contacts 76 and 78 which energizes solenoid 82, moving gate 62 to its dotted line position. This diverts the under-weight article to the other side of the conveyor ribbons 28a. When reset switch 65 is closed by the next article it de-energizes both solenoids 79 and 82 and the gates 62 and 63 are spring biased to their center or "on" weight positions. When an article is "on" weight or within the acceptable weight range neither contacts 60a or 60b are closed, neither solenoid 79 or 82 is energized and the gates 62 and 63 remain in their full line positions allowing the on-weight articles to pass straight through from the weighing conveyor ribbons 2b to the take-off conveyor ribbons 28a.

When more than three divisions are necessary, such as is required in food lines where a certain number of pieces which vary somewhat in weight are to be packaged and the package is to weigh a given amount, a modification of the heretofore described embodiment is necessary.

Figs. 9 through 11, inclusive, illustrate a modified embodiment of the invention suitable for classifying articles into five weight divisions. This embodiment is particularly suitable for sorting sausages or the like which are to be sold in packages containing a preselected number and within a weight tolerance, as for example, a five item package having a 10 ounce total weight with a tolerance of plus one-quarter ounce and no underweight. In such a case, as shown in Figs. 9 and 10, a central bin 83c, of five like bins 83a, 83b, 83c, 83d and 83e, which are generally designated 83, is adapted to receive those items within the range of 2.00 to 2.05 ounces. Similarly, each of the other bins is adapted to receive items within a five hundredths ounce tolerance range, the several ranges blanketing the total tolerance range of one quarter ounce allowed for a five item package. Thus, bin 83a receives items within a 1.90–1.95 ounce range and the ranges of 83b, d and e, respectively, are 1.95–2.00; 2.05–2.10; and 2.10–2.15 as indicated on Fig. 9. A package of five items within the acceptable tolerance may be assembled from an item from each bin, five items from central bin or other combination, as will be apparent.

In the embodiment of Figs. 9 to 11, the weight of each successive article or item passing over the weighing conveyor 2 is transferred through an electrical system (Fig. 11) which positions air cylinder 84 and gates 85 to diverting the article by weight into its appropriate bin 83. Air cylinder 84 rotates a shaft 86 by means of levers 87 to swing gates 85 to all of the positions shown in dotted and full lines. Mounted on the shaft 86 are five rotating commutator or selector discs 88a, b, c, d and e of a rotating selector 88 which controls the positioning of the air cylinder 84. Each of these rotating selector discs 88 is made up of two adjacent semi-circular segments 102 and 103 which are separated by an insulating material 104. One side of each of these selectors 88 is electrically connected to a solenoid-operated air valve 105 and the other side 103 is connected to solenoid valve 106.

Weight of an article on the ribbons 2a of carrier 2 (Fig. 9) actuates the air motor 44 in the manner heretofore described with reference to Figs. 3–5.

As shown schematically in Fig. 11, the contacts 56a, 56b, 56c and 56d are adapted to be closed in five combinations which determine the movement and positioning of the air cylinder 84 in accordance with the weight of the article on the receiver 2. The five combinations of closed contacts correspond to the combinations of contacts engageable with the cam segments 54a and 54b on the cam shaft 54 schematically shown in Fig. 11. These combinations of closed contacts corresponding respectively to the weight ranges of bins 83a, b, c, d and e (Fig. 9) are: 56a; 56a and 56b; 56b; 56b, 56c, and 56d; and 56c and 56d.

If, for example, an article is one division overweight, its weight on the receiver 2 will connect one side of the line through contacts 56b, 56c and 56d to the latching coils 97 of the latch type relays 94, 95 and 96. Thereafter, engagement of lever 30a by the article on the conveyor 2 (Fig. 9) operates double-throw reset switch 89 to disconnect solenoids 105, 106 from the leg L1 of the line and connect double-throw firing switch 90 with the leg L1. Thereupon, the switch 90 in its normal position, as shown in Fig. 11, connects the line leg L1 to the reset or unlatching coils 91 of the mechanical latching relays 93, 94, 95 and 96 and to the latch coil 97 of relay 92. Energization of the latching coil 97 of the relay 92 connects each of the latch coils 97 of the relays 93–96, inclusive, with the normally open terminal 90a of the firing switch 90.

When an article operates the lever 30 to close the firing switch contact 90a, the latching coils 97 of the relays 93–96, inclusive, are connected to the line leg L1 thereby energizing those of the coils which are connected through contacts 56 to the other leg L2 of the line. In the present example where the article is one division overweight and the contacts 56b, c and d are all closed, the latching coils 97 of all the relays 92–96 are energized and all of their relay switches closed and latched closed from their normal or open positions shown in Fig. 11.

Immediately upon energization of its latching coil 97, the relay 93 connects the unlatching or reset coil 91 of the relay 92 across the line L, thereby de-energizing the latching coils 97 of all the other relays 93–96 by opening the switch contacts of the relay 92 and thus opening the relay connections through the switches 89 and 90 to the line leg L1.

When the article being weighed leaves the lever 30a, the reset switch 89 returns to its normal position shown in Fig. 11 and connects leg L1 of the line through contact 107 to the solenoid valves 105 and 106. As shown in Fig. 11, the other leg L2 of the line is connected by a contactor 101 and the segment 103 of the commutator disc 88d to the solenoid valve 106 through the relays 94, 95 and 96. The solenoid valve 106 is thereby energized and supplies air from an air line 100 to the air cylinder 84 and retracts piston rod 84a to rotate the shafts 86 and the commutator discs 88 thereby pivoting the gates 85 clockwise until insulation strip 104 of the commutator disc 88d engages its contactor 101 and breaks the connection of the solenoid valve 106 across the line. Thereupon valve 106 closes the line 100 and vents the cylinder 84 to the atmosphere leaving the contactor 101 on the insulation strip 104 and the gates 85 in position to direct an article into the bin 83d. Should the piston rod 84a over-travel, the line connection at 101 would be made through conductor portion 102 of the disc 88d to the solenoid valve 105 thereby reversing the motor 84 and returning the gates 85 to their bin 83d position.

If, for example, the next article is on-weight, contacts 56b are closed and contacts 56a, 56c and 56d remain open thus energizing the latching coil 97 of only the relay 95 thereby connecting the line L through the segment 102 of the commutator disc 88c to the solenoid valve 105 and returning the gates 85 to the central position shown in Fig. 9.

It will be noted at this point that at nowhere within the selected range of operation of the motor 44 are all of the contacts 56a–d open. That is, at least one contact is closed in any position of the conveyor 2 within the weight range.

In lines such as those for soap powder and the like, where filling control is desired, the shaft 86 and commutator 88 (Fig. 10) which are rotated by the air motor 84 may be connected to the feeding adjustment of the filling machine to correct the rate of feed responsively to the weight of the previously filled package.

Some filling lines run at speeds as high as 500 units per minute and are difficult to weigh individually with accuracy. Where this condition is present and only filling control is desired, the length of the receiver conveyor 2 may be made sufficient to hold a plurality of containers as, for example, ten, so that when one box leaves the receiver 2, another box is transferred to the receiver and the equivalent of ten boxes are always on the conveyor. The transfer effects very little if any change in weight. Accurate conveyor length is required and the boxes preferably would be fed adjacent to each other. To overcome the slight deflection caused by transferring, increased damping would be required.

On production lines where packages are made up of a number of variable weight pieces, considerable time and labor is required for hand weighing and correction. Production lines for such products as sliced cold cuts, bacon or other items which may show a gradual change in weight between successive pieces are examples of lines which would be considerably aided by a weighing mechanism that visually indicates the necessary correction of a package in fractions of a piece.

Figure 12:
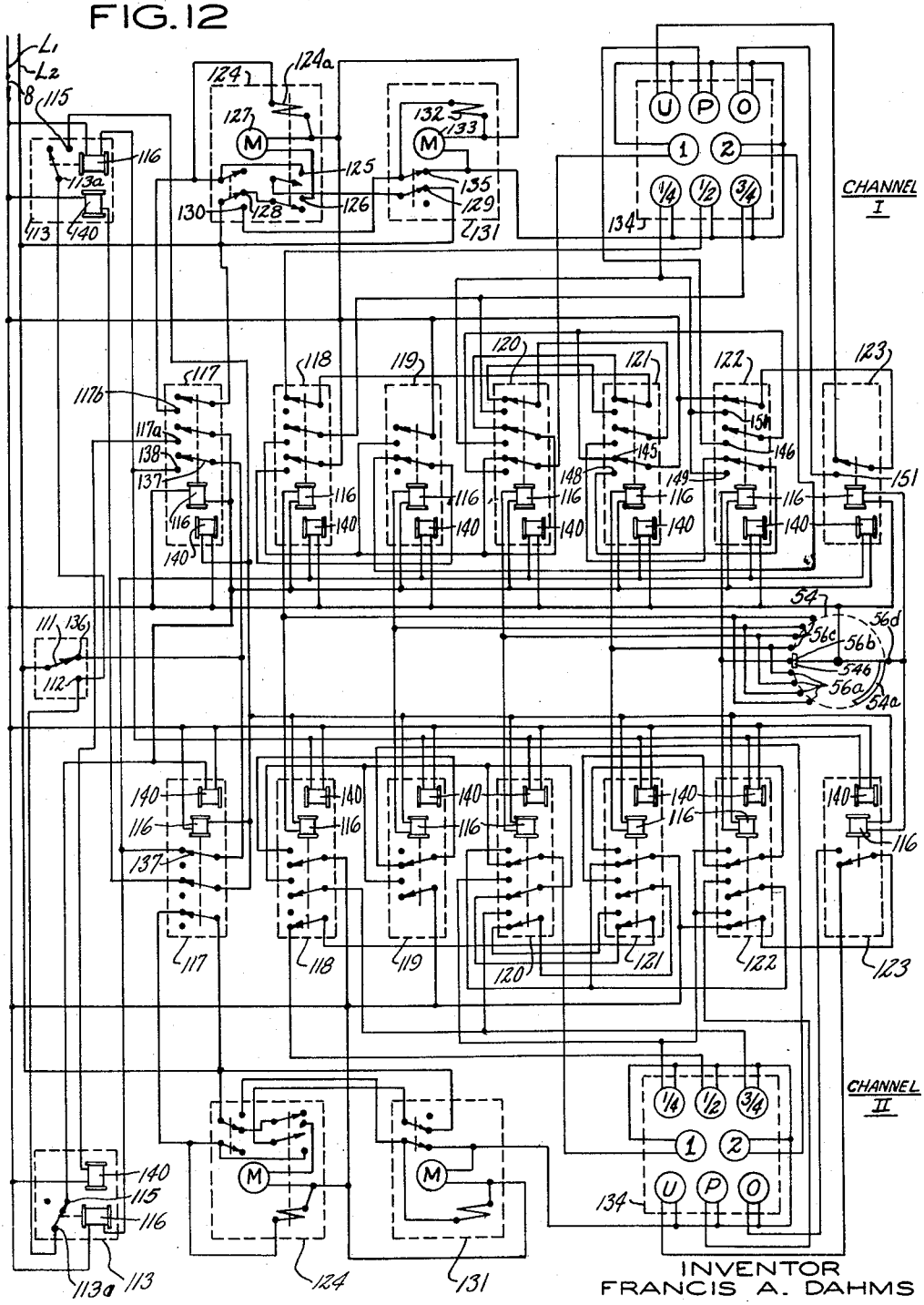
Fig. 12 is a wiring diagram embodying the invention with which visual indication of weight is made by two indicators operating alternately.

Referring to Fig. 12, the wiring diagram there shown, includes two visual weight-indicators 134 which are operated in sequence to allow more time for correction. The two indicators 134 are included in individual activating circuits or channels I and II. Firing switch 111, which is operated by the lever 30 (Fig. 2) in addition to firing holding relays in one channel also energizes the reset coils of the relays in the other channel. Thus when the article being weighed passes over the lever 30, the leg L2 of the line is connected through contact 112 to relay contacts 113a of relays 113 in both channels. In operation, there is always the contact 113a of only one channel closed through relay contact 115 thus allowing the line current from switch 111 to pass through to one channel only. When placing the apparatus in operation, the relay contacts 113a of both channels are open and one of them, as for example contact 113a of channel II, must be manually moved to the closed position shown in Fig. 12. Thereafter, as is hereinafter described, when the contact 113a of one channel is opened, the contact 113a of the other channel is automatically closed.

The air motor selector 54 also connects the other leg L1 of the line to both channels I and II. Starting with channel I, and assuming the air motor selector 54 has been set according to the weight of the article on the receiver as heretofore described with reference to Figs. 4 and 11, as the article operates lever 30 to connect firing switch contact 112 to the line leg L2, line current passing through contact 113a of channel II energizes latching relay coil 116 of latching relay 117 in channel I and as many of the latching relay coils 116 of the latching relays 118–123, inclusive, of channel I as the air motor selector 54 connects to the other leg L1 of the line.

The selector 54 in the on-weight position shown in Fig. 12 connects and energizes the latching relay coils 116 of the relays 122 and 123 of channel I. At the same time the line L2 also energizes reset coil 140 in the relay 117 of channel II. In addition, current passes through contact 117a of the relay 117 in channel I thereby energizing the reset coil 140 of relay 113 in channel II to open contacts 113a and 115 and interrupt flow of line current through the switch 111 so that only a momentary current is supplied to the latching relay coils 116 of the relays 117–123 of channel I. This prevents incorrect indicating from weight changes which occur when the article moves from the receiver 2 to the take away conveyor belts 18a.

Referring to channel I, with coil 116 of the relay 117 momentarily energized, the line current also passes through contact 117b starting timer 124 in channel I. The timer 124 synchronizes the visual indicator 134 of its channel with conveyor travel so that the article travels from the scale conveyor 2 and is at the visual indicator 134 for the channel when the weight signal is indicated by the indicator. That is, when the article reaches an indicator 134, that indicator shows the weight of the article passing it. The timer 124 is started by line current from contact 117b which energizes clutch solenoid 124a and closes contacts 125 and 126, thereby connecting and starting the timer motor 127 through contacts 126 and 128. The timer solenoid 124a is held energized through contacts 129 and 125. This holding circuit is required so that when channel II is fired, the contact 117b of channel I may be opened without interrupting the timer 124.

At the end of the preselected time of timer 124, contact 128 is opened and contact 130 is closed thereby stopping motor 127 and starting a timer 131, which controls the time the indicator 134 is energized. The line from contact 130 energizes clutch solenoid 132 and starts timer motor 133. The contact 130 is also connected through timer contact 135 to one side of all the light bulbs (U, P, O, 1, 2, ¼, ½, ¾) in the indicator 134. The current is supplied to the other side of these bulbs from the latching relays 118–123 of the channel. At the end of the "on time" of timer 131 contact 129 is broken de-energizing solenoid 124a in the timer 124 and thereby opening the contacts 125 and 126. The timer 124 also opens contact 130 at the completion of its "on time" resetting timer 131. The line to the indicator 134 is broken by contact 135. The timer motor 133 is also stopped when contact 135 is opened. When timer 131 is reset the supply line remains open thru contact 130.

When the weighed article releases the lever 30 the switch 111 connects the line thru contact 136 to contact 137 of the relays 117 of both the channels. But as previously stated, when channel I is fired, reset coil 140 of relay 117 in channel II and latching coil 116 of relay 117 in channel I are energized. Thus the current from the reset contact 136 only passes thru the contact 137 of the relay 117 in the channel that was previously fired, as the contact 137 of the relay 117 in the other channel is in reset (unlatched or open) position. The line from contact 137 thru 138 in channel I energizes the latching coil 116 of relay 113 in channel I and energizes the reset coils 140 of the relays 118 to 123 in the channel II. This sets the channel II for holding the signal for the weight of the next article to be weighed. Thus when switch 111 next engages contacts 112, contact 113a in channel II being open and contact 113a in channel I being closed, current is fed through contact 115 of channel I to the latching coils 116 of relays 118 to 122 of channel II and the latter channel records the signal of selector 54. Successive engagements of contacts 111 and 112 alternately energize the coils 116 in the relays 113 of channels I and II so that the channels alternately indicate the signal of the selector 54. The air motor 44 in this system is that shown in Figs. 4 and 5. As illustrated and described with reference to Fig. 11, there is always at least one contact closed by the selector 54. Selector contact 56d is for the under-over circuit, 56b is for pass and the other contacts 56a and 56c are for numeral indication. The pairs of contacts 56a and c are connected, the 56a contacts for under weight and contacts 56c for over weight amounts.

If, for example, the coils 116 of relays 122 and 123 are energized, the line current passes thru contacts 145 and 146 to the "P" or pass bulb on the indicator registering on-weight. All other light bulbs in the indicator 134 are disconnected from the line. If the coil 116 of only the relay 122 is energized, "pass" would still be indicated. If the coils 116 of the relays 121, 122 and 123 are energized through the selector 54, the line current passes thru the contacts 148 and 149 to the "¼" bulb of the indicator 134 and also thru contacts 150 and 151 to the "O" or over-weight bulb of the indicator. This shows that the article is over ¼ of a strip of bacon or other unit. The operation is the same thru the full range of the relays 118 to 123 so as to indicate from under two to over two units by ¼ units or divisions. The indicators may be graduated in any number of divisions and indicate in either weight or number of pieces. The number of channels and indicators may be varied to suit requirements. The two indicators 13 shown in Fig. 12 may be located one on each side along the take-off conveyor adjacent to the receiver 2. Operators may be stationed at each indicator 134 for hand correction of the package passing an indicator when the indicator is lighted.

Other adaptations, variations and weighers embodying other than those heretofore described, will be apparent to those skilled in the art.

I claim:

1. Weighing apparatus comprising a balance having a receiver for articles to be weighed, pneumatic means responsive to changes in weight on said receiver and including a discharging air line and means including a differential flow control for maintaining a constant flow of air in the said line, means throttling the discharge from said line responsive to changes in weight on said receiver, means responsive to the pressure of the said air line to indicate the weight on said receiver, and a pneumatic relay responsive to the pressure in said air line for transmitting to said weight indicating means a pressure proportional to the pressure in said air line.

2. Weighing apparatus including a balance having a receiver for articles to be weighed thereon, a conveyor carried by said receiver, an additional conveyor independent of the receiver for removing articles from the receiver conveyor, drive means for continuously operating the conveyor, pneumatic means responsive to changes in weight on said receiver including a discharging air line and means including a differential flow control for maintaining a constant flow of air in the said line, means throttling the discharge from said line responsive to changes in weight on said receiver, and means responsive to the pressure of the said air line for diverting articles on said additional conveyor in accordance with their weight on the receiver conveyor.

3. Weighing apparatus including a balance having a receiver for articles to be weighed thereon, a conveyor carried by said receiver, an additional conveyor independent of the receiver for removing articles from the receiver conveyor, drive means for continuously operating the conveyors, pneumatic means responsive to changes in weight on said receiver including a discharging air line and means including a differential flow control for maintaining a constant flow of air in the said line, means throttling the discharge from said line responsive to changes in weight on said receiver, means responsive to the pressure of the said air line to indicate the weight on said receiver, and means responsive to the pressure of the said air line for diverting articles on said additional conveyor in accordance with their weight on the receiver conveyor.

4. Weighing apparatus including a balance having a receiver for articles to be weighed thereon, a conveyor carried by said receiver, an additional conveyor independent of the receiver for removing articles from the receiver conveyor, drive means for continuously operating the conveyors, pneumatic means responsive to changes in weight on said receiver including a discharging air line and means including a differential flow control for maintaining a constant flow of air in the said line, means throttling the discharge from said line responsive to changes in weight on said receiver, means responsive to the pressure of the said air line to indicate the weight on said receiver including a plurality of indicators and means for indicating the weight of successive articles on said indicators successively, and means responsive to the pressure of the said air line to divert articles on said additional conveyor in accordance with their weight on the receiver conveyor.

5. Weighing apparatus as defined in claim 4 and including means for delaying indication of the weight of an article on one of the said indicators until the weighed article is on the additional conveyor and another article is on the receiver conveyor.

6. Weighing apparatus as defined in claim 5 and also including means for channeling the weight of the said other article to another of said indicators.

References Cited in the file of this patent

UNITED STATES PATENTS

| | | |
|---|---|---|
| 2,408,842 | Garretson | Oct. 8, 1946 |
| 2,486,052 | Moore | Oct. 25, 1949 |
| 2,488,037 | Rupley | Nov. 15, 1949 |
| 2,544,734 | St. Clair | Mar. 13, 1951 |
| 2,568,255 | Schieser et al. | Sept. 18, 1951 |
| 2,591,868 | Puster et al. | Apr. 8, 1952 |
| 2,699,932 | Knobel | Jan. 18, 1955 |
| 2,712,408 | Weber | July 5, 1955 |
| 2,773,685 | Aagaard | Dec. 11, 1956 |